United States Patent
Schmit et al.

(10) Patent No.: US 9,167,260 B2
(45) Date of Patent: Oct. 20, 2015

(54) APPARATUS AND METHOD FOR VIDEO PROCESSING

(75) Inventors: Michael L. Schmit, Cupertino, CA (US); John W. Brothers, Sunnyvale, CA (US); Radhakrishna Giduthuri, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 769 days.

(21) Appl. No.: 13/196,181

(22) Filed: Aug. 2, 2011

(65) Prior Publication Data

US 2013/0034160 A1 Feb. 7, 2013

(51) Int. Cl.
*H04N 7/12* (2006.01)
*H04N 11/02* (2006.01)
*H04N 11/04* (2006.01)
*H04N 19/43* (2014.01)
*H04N 19/436* (2014.01)

(52) U.S. Cl.
CPC .............. *H04N 19/43* (2014.11); *H04N 19/436* (2014.11)

(58) Field of Classification Search
CPC .............................. H04N 7/50; H04N 7/26244
USPC ........................................ 375/240.16, 240.12
See application file for complete search history.

(56) References Cited

U.S. PATENT DOCUMENTS

| | | | | |
|---|---|---|---|---|
| 5,448,310 | A * | 9/1995 | Kopet et al. | 348/699 |
| 5,912,676 | A * | 6/1999 | Malladi et al. | 345/531 |
| 2008/0126278 | A1 * | 5/2008 | Bronstein et al. | 706/17 |

* cited by examiner

*Primary Examiner* — Chikaodili E Anyikire
(74) *Attorney, Agent, or Firm* — Volpe and Koenig, P.C.

(57) ABSTRACT

Methods and apparatus for facilitating motion estimation in video processing are provided. Preferably, coordinates of a search area within a video frame are determined for each of a plurality of macroblocks (MBs) of a reference frame based upon a predicted location derived from the coordinates of the MB within the reference frame and motion estimation information. The video frame can be segmented into tiles and associated overlapping tile defined for at least some tiles. Search data is defined for each tile as pel data for each pixel within that tile and any associated tile. Macroblock searches are preferably conducted on a tile assignment basis with tile search assignments distributed among a plurality of processing elements. Each processing element preferably has a local memory it uses for the search data when performing a tile search assignment.

33 Claims, 8 Drawing Sheets

APPARATUS AND METHOD FOR VIDEO PROCESSING

FIELD OF INVENTION

The present invention is generally directed to the processing of video data and, in particular, to facilitating motion estimation in connection with such processing.

BACKGROUND

The processing of video data is generally well known in the art. Generally, data for video is defined by a series of frame images of an X by Y pixel resolution. For facilitating efficient processing, pixel (pel) data for each frame is customarily handled in macroblock (MB) groups. Typical MB sizes include 4×16, 8×8 and 16×16 row by column blocks of pel data. Usually each dimension is preferably some power of two when employing binary digital processing.

Figure 1A:
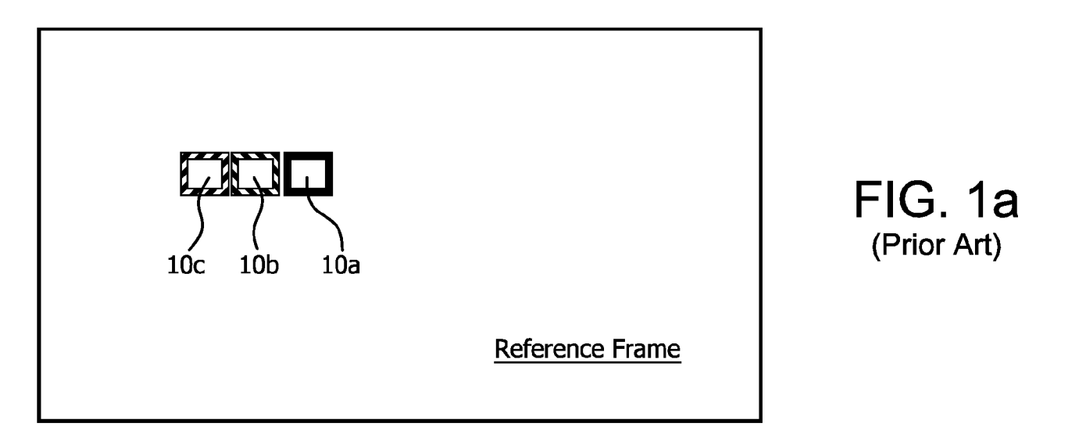
FIGS. 1a and b are illustrations of the location of MBs in a reference frame and corresponding search areas for the reference frame MBs in a subsequent frame used in a conventional motion estimation determination.
Figure 1B:
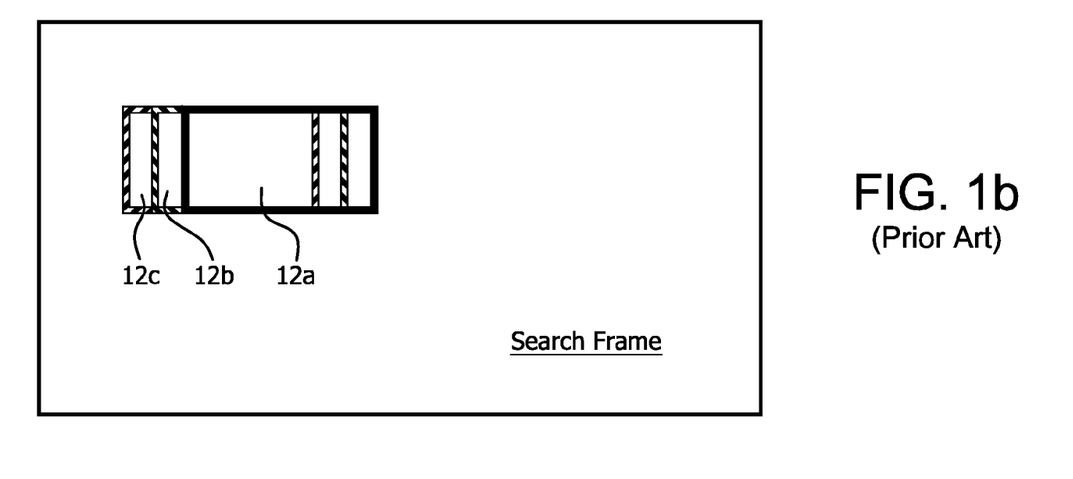

For various types of video processing, such as video encoding, frame rate conversion, super-resolution, etc., it is desirable to perform motion estimation by finding where MBs of image data (or altered versions thereof) that appear in a reference frame are located in a subsequent frame. Conventionally, the image data of a MB located at a particular coordinate location in a reference frame is searched for in a subsequent frame within a search block that surrounds the MB reference block location. For example, FIG. 1a illustrates MB 10a at a particular location within a reference and FIG. 1b illustrates a corresponding search area 12a in a subsequent frame for the MB 10a.

MB searches within search areas are typically performed using a pixel based comparison, such as using an accumulation of the sum of the absolute value of differences calculation comparison of the pel values of the MB 10a to corresponding pel values with respect to each MB-sized area within the search area 12a. To conduct a search, the pel data for the entire search area must be available. Where it is desirable to search for all of the MBs of a reference frame in a subsequent frame, such processing is highly calculation intensive and becomes more calculation intensive and time sensitive as resolution sizes and frame speeds increase.

A given search for a MB within a search area will not always obtain a positive result since the MB of the reference frame (or altered version thereof) may simply not be present in a subsequent frame. Quite often, however, the same or an altered version of the same MB will appear in a subsequent frame so that when that image (or altered version) is found in a subsequent frame, a motion vector can be defined for the MB based on the MB location in the reference frame and the MB location in the search frame. Where a motion vector for the MB was previously determined, the prior motion vector can also be used in the determination of an updated motion vector.

Where a reference frame MB (or altered version thereof) is located in the search frame and a motion vector can be determined, that information is useful in facilitating the efficient processing of the video data as a whole. However, there can be instances where the image of a MB is moving at such a high speed that it in fact appears in the search frame being searched outside of the corresponding search area and accordingly is not detected. In such cases, the opportunity for determining a motion vector for that MB of the frame image, and using it to facilitate efficient processing, is lost.

The size of the search area is typically selected to be a number of pixels larger in both height and width than the MB. Although it is possible to search an entire search frame for the MBs of the reference frame, the time needed to perform such searches is prohibitive. Generally, a smaller search window requires less time to perform a search, but has a greater chance of missing detection of a MB that actually appears in the searched frame, but beyond the boundaries of the search area.

The following provides an example of a search area size and relative location. If MB 10a represents pel data for a 4×16 block of pixels, the search area 12a may be selected as 12×24, i.e., 8 pixels greater in both height and width. For convenience, the pixel location of an upper left corner of a MB or search area can be used to define its location within a frame. Where the upper left pixel of MB 10a is located at coordinates $X_i$, $X_j$, of the reference frame, the upper left pixel coordinate of the search area 12a in the search frame for MB 10a can be located at coordinates $X_{i-4}$, $Y_{j-4}$ to provide a surrounding four pixel search area about the relative location of the MB 10a in the reference frame.

Similarly, MBs 10b and 10c that are adjacent to MB 10a in the reference frame depicted in FIG. 1a, have corresponding search areas 12b, 12c in the subsequent frame. Since the MBs 10a, 10b, 10c are adjacent, there is a substantial overlap with the corresponding search areas 12a, 12b, 12c.

Figure 2:
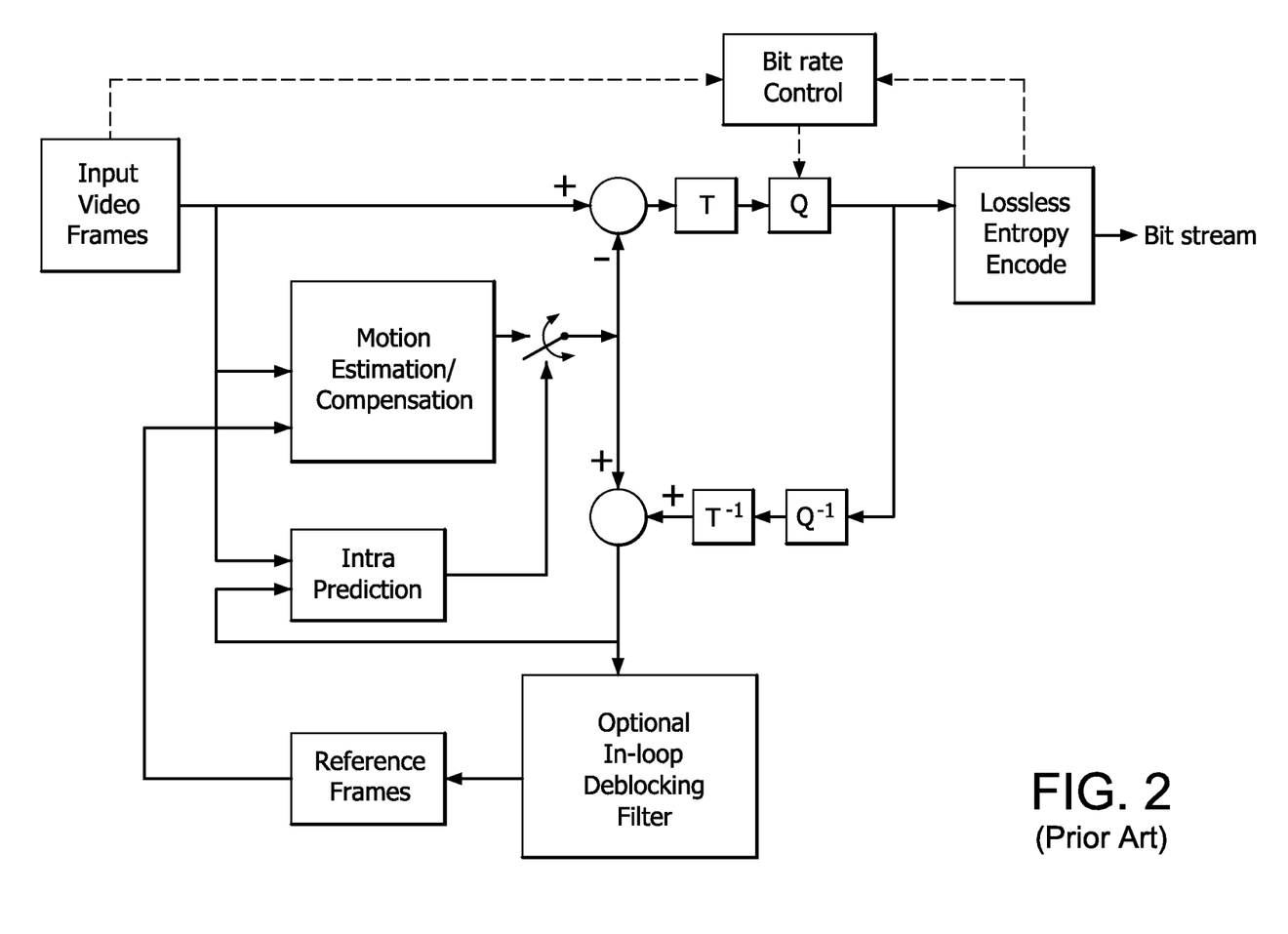
FIG. 2 is a block diagram of a conventional video encoding apparatus that utilizes motion estimation in video data processing.

One context where motion estimation is typically used is video encoding. FIG. 2 illustrates an example of a conventional video encoder that receives data for video frames as input and outputs an encoded bit stream of encoded video data. One common method for encoding graphics/video involves encoding using discrete-cosine transform (DCT) processing so the encoded video content is translated into DCT coefficients. To playback/decode such encoded video, the use of inverse discrete-cosine transform (iDCT) processing is one of the required steps.

For MPEG-2 video encoding, for example, the video is defined in frames of pixels represent by YUV values. DCT processing is then performed with respect to blocks of YUV pixel data to result in blocks of DCT coefficients that are quantized and entropy coded using a variable-length code (VLC) that results in much of the video data of an MPEG-2 encoded bit stream that generally also includes motion vector and audio data. To decode the video of such an MPEG-2 bit stream, the processes with respect to the VLC encoded data must be reversed, but some loss of data quality is sacrificed because the encoding quantization process is not fully reversible (i.e., MPEG-2 represents a lossy coding scheme).

Referring to the FIG. 2 example, the input video data generally includes YUV values for each pixel of each frame of a video. Macroblocks of pixel data are processed along a primary encoding path by transform component T that performs DCT processing to produce blocks of DCT coefficients that are then processed by a quantization component Q. The quantized blocks of DCT coefficients are then processed by an entropy encoder to produce the bit stream output.

To include motion vector data, additional components are provided. In particular, a motion estimation/compensation component is provided which executes a comparative search to find a new relative location of MBs of a reference frame in a subsequent video frame. The reference frame is typically generated from quantized blocks of DCT coefficients of a previously processed video frame by processing them through an inverse quantization component $Q^{-1}$ and an inverse transform component $T^{-1}$ to generate MBs of pixel data of a given reference frame.

Figure 3:
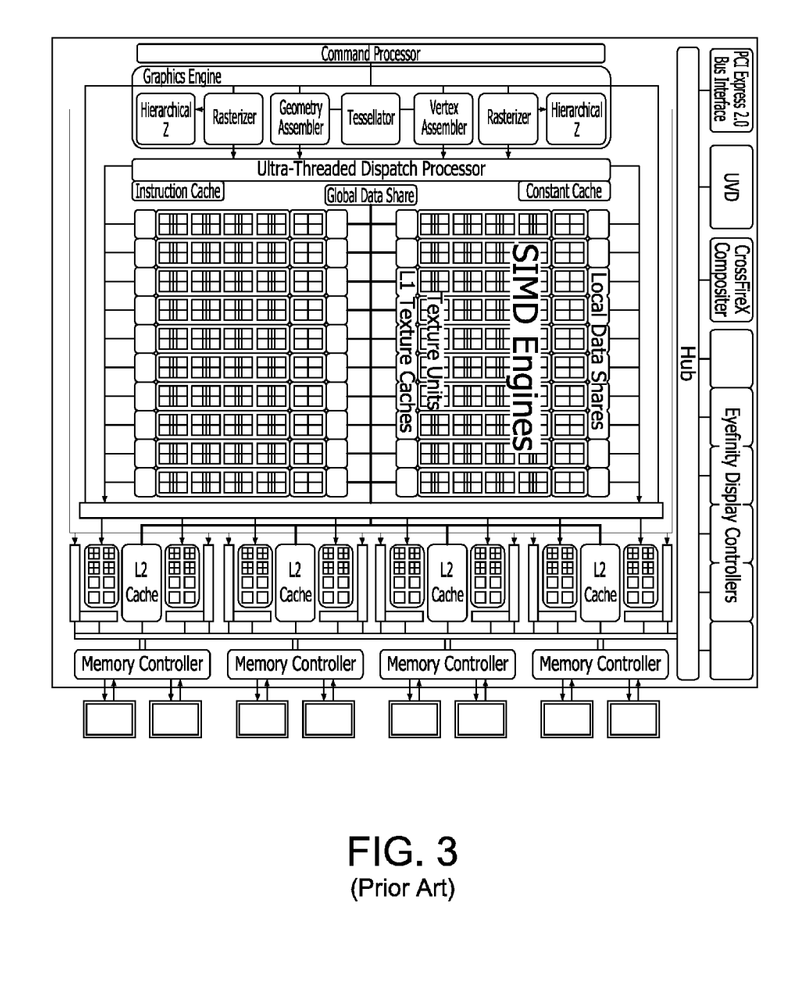
FIG. 3 is a block diagram of an example prior art GPU.

Graphics processing units (GPUs) have been developed to assist in the expedient processing of video data. GPUs have been developed with expanded processing functionality through configurations that utilize single instruction, multiple data (SIMD) processing engines that include local data storage (LDS) memory and processing components known as shaders. For example, FIG. 3 illustrates a prior art GPU, namely the ATI Radeon HD 5800 series GPU. The Radeon HD 5800 series GPU has approximately 2.72 TeraFLOPS of processing power. This exemplary GPU features 20 SIMD engines, each with LDS memory and 16 processors (shaders), i.e., 320 shaders. The Radeon HD 5800 series GPU also sports 80 texture units, 4 per SIMD engine, and a Graphics Double Data Rate (GDDR) memory interface that offers approximately 150+GB/sec of peak bandwidth.

SUMMARY OF EMBODIMENTS OF THE INVENTION

Methods and apparatus for facilitating motion estimation in video processing are provided.

In one aspect of the invention, a video frame is segmented into tiles and associated overlapping tiles are defined for at least some tiles. Search data is defined for each tile of pel data for each pixel within that tile and any associated overlapping tile. Coordinates of a search area are determined within the video frame for each of a plurality of macroblocks of a reference frame. The number of search areas entirely within each tile and any overlapping tile associated with that tile is determined. Tile assignments are made among a plurality of processing elements based at least in part of the number of search areas determined to conduct macroblock searches concurrently. Macroblock searches are conducted using a local memory of the assigned processing element for the search data associated with the assigned tile.

In one example, motion estimation determinations for macroblocks (MBs) of a video frame are selectively divided into groups that facilitate efficient use of the resources of a processor such as, for example, a graphic processing unit (GPU). In one example, the partitioning of MB motion estimation determinations is based upon the selective utilization of a local data storage (LDS) of SIMD engines of a processor to facilitate fast, efficient searches for reference MBs in a subsequent video frame.

In another aspect of the invention, coordinates of a search area within a video frame are determined for each of a plurality of MBs of a reference frame based upon a predicted location derived from the coordinates of the MB within the reference frame and motion estimation information. Searches for the MBs are then conducted within their respective search areas within the video frame.

Preferably, a processing component is provided that is configured to perform the disclosed methods which can be advantageously employed in either the encoding or display of video. Accordingly, the processing component can be part of a video capture device, a display device, or a device that both captures and displays video either as a separable or integrated component of such devices.

BRIEF DESCRIPTION OF THE DRAWINGS

FIG. 4a is an illustration of an example of the segmentation of a video frame into tiles to facilitate motion estimation determination.

FIG. 4b is an illustration of an example of associated overlapping tiles that are defined with respect to one of the tiles of FIG. 4a.

DETAILED DESCRIPTION

As noted above, video data is generally defined by a series of frame images of an X by Y pixel resolution. Typical resolutions include 800×600 pixels and 1920×1080 pixels. For facilitating efficient processing, pixel (pel) data for each frame is customarily handled in macroblock (MB) groups. Typical MB sizes include 4×16, 8×8, and 16×16 row by column blocks of pel data. Usually each dimension is preferably some power of two when employing binary digital processing.

For various types of video processing, such as video encoding, frame rate conversion, video transcoding, super-resolution, etc., it is desirable to perform motion estimation by finding where MBs of image data (or altered versions thereof) appear in a reference frame are located in a subsequent frame. To support improved coding and/or decoding such as, for example, those embodiments where real time or faster than real time coding and/or display of video where motion estimation is used, all of the searches for MBs of a reference frame must be fast enough so that video processing can be timely completed. The amount of processing required is generally related to the resolution of the video frames that are being processed.

Figures 4A, 4B:
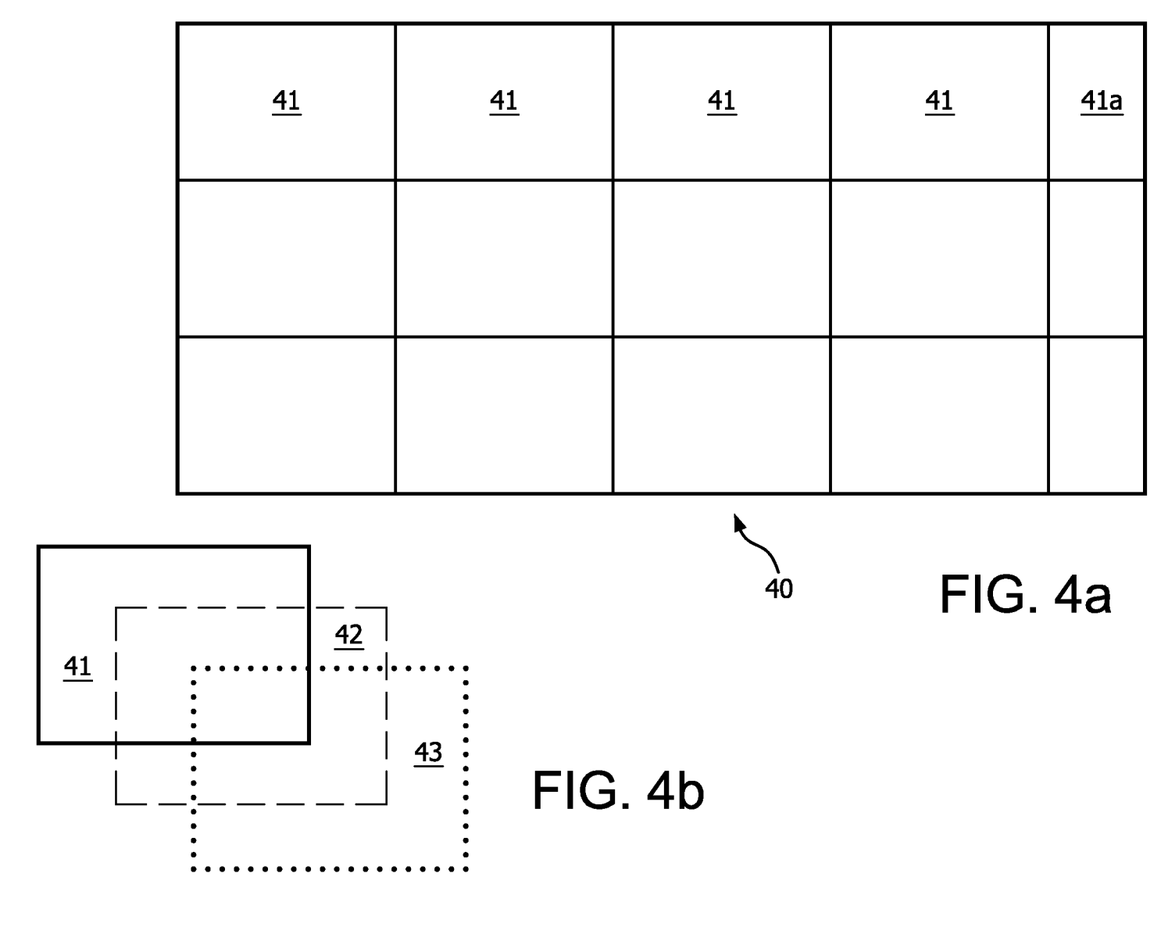

Referring to FIG. 4a, a video frame 40 is illustrated that is segmented into tiles 41. The segmentation is provided as a means for partitioning the workload occasioned by the need to conduct MB searches to conduct concurrent searches with a plurality of processing elements, such as SIMD engines of a processor. Such a processor can be implemented as part of large device such as a graphics processing unit (GPU), a CPU, an image processor, or the like.

Preferably, the tiles 41 are significantly larger than the size of the MB search area, but are not so large that pel data, corresponding to the pixels located within each tile, exceeds the capacity of a local memory associated with the processing elements (e.g., SIMDs) that are to conduct the MB searches.

Preferably, the tiles 41 are of equal size. However, having equal size tiles is not essential. Even where a desired size of tile predominates, there may be some smaller or larger tiles, such as tile 41a, to completely analyze an entire video frame 40.

Also, specially sized tiles and/or overlapping tiles can be defined to cover inter-tile boundary areas so that all MB search areas fall entirely within at least one tile or overlapping tile. Such tiles may be defined after generating lists of MBs falling entirely within defined tiles and associated overlapping tiles and defining further tiles or overlapping tiles to extend over the MB search areas for MBs not contained in any of the MB lists.

Preferably, the tiles are assigned amongst a plurality of processing elements to concurrently conduct searches for MBs of a reference frame within the video frame. Because the search areas defined for reference frame MBs may extend across tile area boundaries, associated tiles that are preferably overlapping are defined such that each search area of the MBs of a reference frame for which a search is to be conducted is contained entirely within at least one of the tiles or associated tiles.

For searching, associated tiles are preferably defined. That is, each tile is associated with one or more other tiles. Additionally, a tile of a group of associated tiles preferably includes an area that overlaps areas of one or more other tiles within the group of associated tiles. A tile and any tile associated with that tile preferably define a tile assignment unit with respect to conducting MB searches. Search data is accordingly defined for each tile that comprises pel data for each pixel within that tile and any tile associated with that tile.

FIG. 4b is illustration of an example associated overlapping tiles that are defined with respect to one of the tiles 41 of FIG. 4a. A first overlapping tile 42 is disposed at a location that is shifted a predetermined number of pixels vertically and/or horizontally displaced from the tile 41 with which it is associated. Preferably there is an overlapping pixel area of 20-80% between the tile 41 and the first overlapping tile 42. A second overlapping tile 43 is disposed at a location that is shifted the predetermined number of pixels vertically and/or horizontally displaced from the first overlapping tile. Preferably there is an overlapping pixel area of 20-80% between the first overlapping tile 42 and the second overlapping tile 43. Tiles 41, 42, and 43 form all or part of a tile assignment unit.

In one example, where the video frame 40 is 1920×1080 pixels, the tiles 41, 42, 43 of FIG. 4b are each 64×48 pixels with the first overlapping tile 42 displaced 16 pixels horizontally and 16 pixels vertically from the tile 41 and the second overlapping tile 43 displaced 16 pixels horizontally and 16 pixels vertically from the first overlapping tile 42. This is provided as a non-limiting example regarding the video frame and tile sizes as well as the amount of displacement of overlapping tiles. The overlapping tiles may be displaced only in either the vertical or horizontal direction without displacement in the other direction.

An assigned processing element will preferably conduct searches for all of the MBs that have search areas entirely within an assigned tile or any overlapping tile associated with assigned tile using its local memory for the search data associated with the assigned tile. Where the example tile 41 of FIG. 4b is assigned to a processing element for conducting MB searches, the search data for such an assignment includes pel data for each pixel within that tile 41 or either the first overlapping tile 42 or the second overlapping tile 43.

For such example, MB searches made based upon such assignment are preferably made by loading pel data for each pixel within the tile 41 into the local memory of the assigned processing element and conducting a first set of searches for all of the MBs that have search areas entirely within the assigned tile.

Thereafter, pel data for each pixel within the first associated overlapping tile 42 is loaded into the local memory of the assigned processing element to conduct a second set of searches. The second set of searches is conducted for all of the MBs that have search areas entirely within the first overlapping tile 42 that are not MBs for which a search was conducted during the first set of searches with respect to the tile 41. In conducting the second set of searches, only the pel data for pixels within the first overlapping tile 42, but outside of the assigned tile 41, need to be loaded since the pel data for the pixels within the tile 41 had been previously loaded for the first set of searches. Also, as needed, pel data that was previously loaded for the first set of searches for pels outside of the first overlapping tile 42 can be overwritten when loading the additional pel data for the second set of searches.

To complete the assigned tile search, pel data for each pixel within the second associated overlapping tile 43 is loaded into the local memory of the assigned processing element to conduct a third set of searches. The third set of searches is conducted for all of the MBs that have search areas entirely within the second overlapping tile 43 that are not MBs for which a search was conducted during the first or second sets of searches. In conducting the third set of searches, only the pel data for pixels within the second overlapping tile 43 that was not previously loaded, needs to be loaded, since the pel data for the pixels within the overlapping area had previously loaded for the second set of searches. Also, as needed, pel data that was previously loaded for the first or second sets of searches for pels outside of the second overlapping tile 43 can be overwritten when loading the additional pel data for the second set of searches.

The above example reflects a sliding window type approach for conducting MB searches with respect to the video frame 40 of FIG. 4. The selection of tile sizes such that the corresponding pel data of a tile can be accommodated within the local memory of an assigned processing element enables the assigned processing elements to expediently conduct searches of all MBs having their search areas entirely contained within the tile. The sliding window approach avoids the need for loading an entire tile's worth of pel data for each set of searches within a MB search assignment which further enhances the efficient processing of the MB searches.

The amount of processing required to complete an entire MB search assignment conducted in accordance with the above example is directly dependent on how many searches are required to be conducted collectively with respect to the first, second and third sets of searches, as well as the size of the MB search areas and size of the MBs being searched for. Typically, the MBs will have a uniform size, and the MB search areas will be defined having a uniform size so that the collective number of searches to be conducted for a search assignment will be one of the most significant factors in making assignments among available processing elements to conduct concurrent MB searches with respect to a video frame.

In determining MB search areas, the conventional approach illustrated in FIGS. 1a and 1b can be used that determines the location of the search area in a video frame for a MB of a reference frame based strictly upon the location of the MB within the reference frame. However, once motion estimation is conducted and motion vector data is generated, motion vector data may be available with respect to MBs of a reference frame for which searches are to be conducted in a subsequent frame. Accordingly, in lieu of using the conventional approach illustrated in FIGS. 1a and 1b for determining MB search area locations, it is preferred to use a method that includes using a prediction vector in addition to the location of the MB within the reference frame.

Figure 5A:
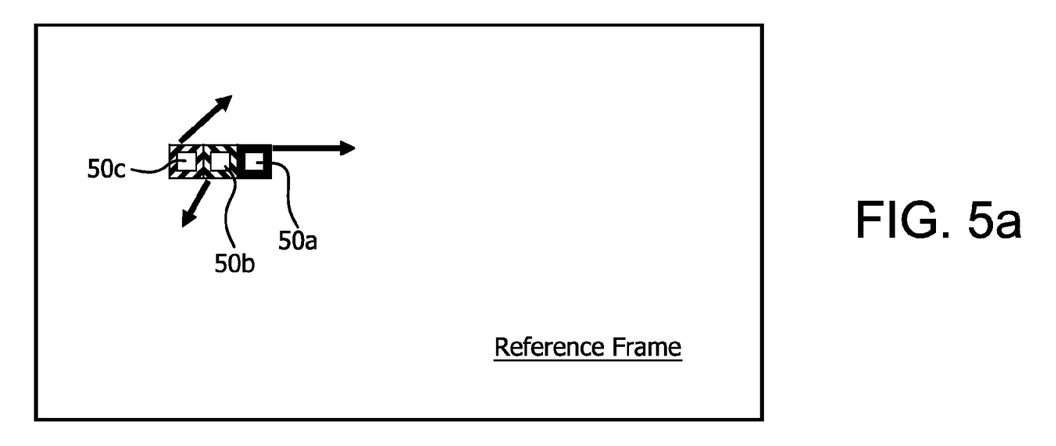
FIGS. 5a and 5b are illustrations of the location of MBs in a reference frame and corresponding search areas for the reference frame MBs in a subsequent frame.
Figure 5B:
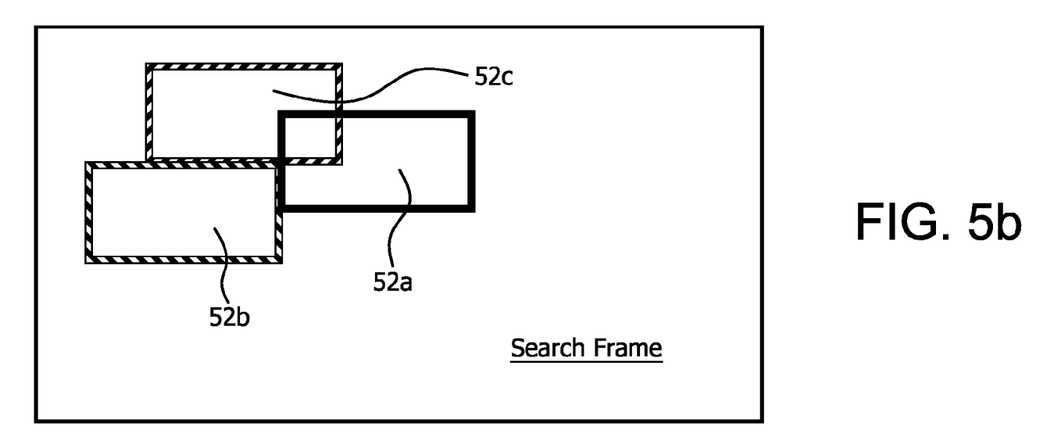

FIGS. 5a and 5b illustrate the location of MBs 50a, 50b, 50c in a reference frame and corresponding search areas 52a, 52b, 52c for the reference frame MBs 50a, 50b, 50c in a subsequent frame that are determined using both the location of the MB within the reference frame and prediction vectors. FIG. 5a illustrates three adjacent MBs 50a, 50b, 50c located in the reference frame at the respective locations of the MBs 10*a*, 10*b*, 10*c* of FIG. 1*a*. The three MBs 50*a*, 50*b*, 50*c* of FIG. 5*a* are each shown with a prediction vector, preferably derived from previously obtained motion estimation data determined with respect to MBs 50*a*, 50*b*, 50*c*.

In contrast to the corresponding search areas 12*a*, 12*b*, 12*c* of the reference frame MBs 10*a*, 10*b*, 10*c*, the corresponding search areas 52*a*, 52*b*, 52*c* for the reference frame MBs 50*a*, 50*b*, 50*c* have little overlap and are relatively scattered about the search frame due to the use of the prediction vectors in determining their locations. For convenience, the pixel location of an upper left corner of a MB or search area can be used to define its location within a frame. Where the upper left pixel of MB 50*a* is located at coordinates $X_i$, $X_j$, of the reference frame (as with the example of MB 10*a*), the upper left pixel coordinate of the search area 52*a* in the search frame for MB 50*a* can be located at coordinates $X_{(i+p.horiz)-4}$, $Y_{(j+p.vert)-4}$ in order to provide a surrounding four pixel search area about a projected relative location $X_{(i+p.horiz)}, Y_{(j+p.vert)}$ of the MB 50*a* where that MB's prediction vector is (p.horiz, p.vert).

By using prediction vectors in determining the MB search area locations, there is an increased probability that any search conducted for a MB within such a search area will find the MB whenever the MB still appears in the video frame. As such, a smaller search area size can be used for the search areas 52*a*, 52*b*, 52*c* illustrated in FIG. 5*b* as compared to the search areas 12*a*, 12*b*, 12*c* illustrated in FIG. 1*b* with a relatively equal probability of successful searches. To the extent a smaller search can be used, the speed of the searching operations is increased, because a fewer number of pixel comparisons are required to conduct a search.

One example of conducting a search of a video frame for MBs of a reference frame where the video frame has been segmented into tiles where at least some of the tiles have associated overlapping tiles is as follows:

Determine MB search area locations based on MB reference location and, where available, previously determined motion estimation data;

For each target tile, generate a filtered list of MBs whose search areas are entirely within the target tile, including those MBs whose search areas are entirely within each overlapping tile associated with the target tile;

Generate statistics for each target tile MB search assignment, such as histogram, median, or average, to determine how evenly distributed the workload is per target tile MB search assignment;

If needed break some tiles into two or more parts so that no one target tile MB search assignment is excessive and/or exceeds a predetermined threshold;

Assign the target tile MB search assignments among available processing elements for concurrent processing with an aim of creating a balanced workload among the processing elements; and Conduct the assigned MB searches such that each processing element uses its local memory for the MB search data of the MB search assignment.

The last step is generally the most processing intensive and time consuming step.

With respect to creating a balanced workload among the processing elements, some processing elements may have only one assignment where other processing elements have multiple assignments due to the number of searches to be conducted with respect to the respective tile assignments. Preferably, the balanced workload among the processing elements is defined such that no processing element is provided with multiple tile assignments unless each processing element is given at least one tile assignment with respect to the searches of a particular video frame.

In general, the search areas for each MB are preferably based on a prediction that may be derived from any numbers of sources. In order to determine all the overlapping search windows that occur within a tiled memory space, a list of MB processing order is sorted based on the predicted starting location rather than the conventional approach that processes the MBs in their raster scan order or some other order that is based on the original coordinate location of the MB.

Figure 6A:
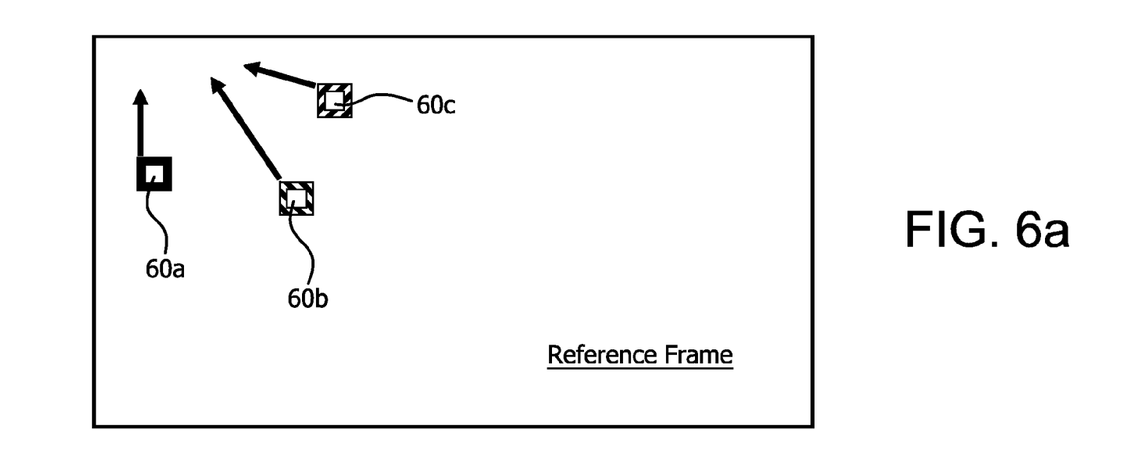
FIGS. 6a and 6b are illustrations of the location of MBs in a reference frame and corresponding search areas for the reference frame MBs in a subsequent frame that fall within an assigned tile.
Figure 6B:
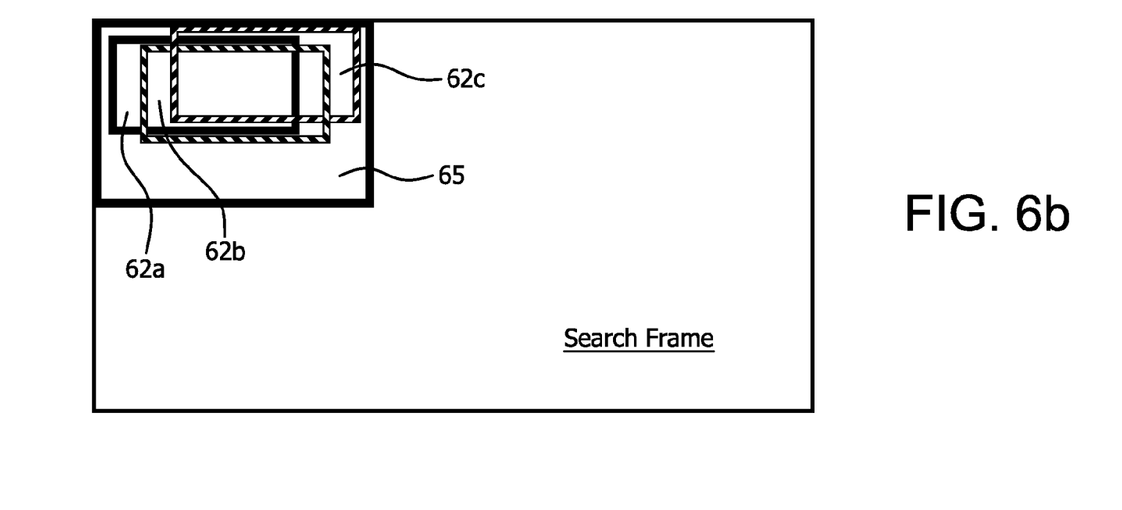

FIG. 6*a* illustrates the location in a reference frame of MBs 60*a*, 60*b*, 60*c* and associated prediction vectors; FIG. 6*b* illustrates corresponding MB search areas 62*a*, 62*b*, 62*c* in a video frame with respect to which tiles have been defined such as tile 65. Since all three MB search areas 62*a*, 62*b*, 62 fall entirely within the tile 65, all of the MBs 60*a*, 60*b*, 60*c* are included in the filtered list of MBs with respect to tile 65 when conducting the method steps set forth above.

Figure 7A:
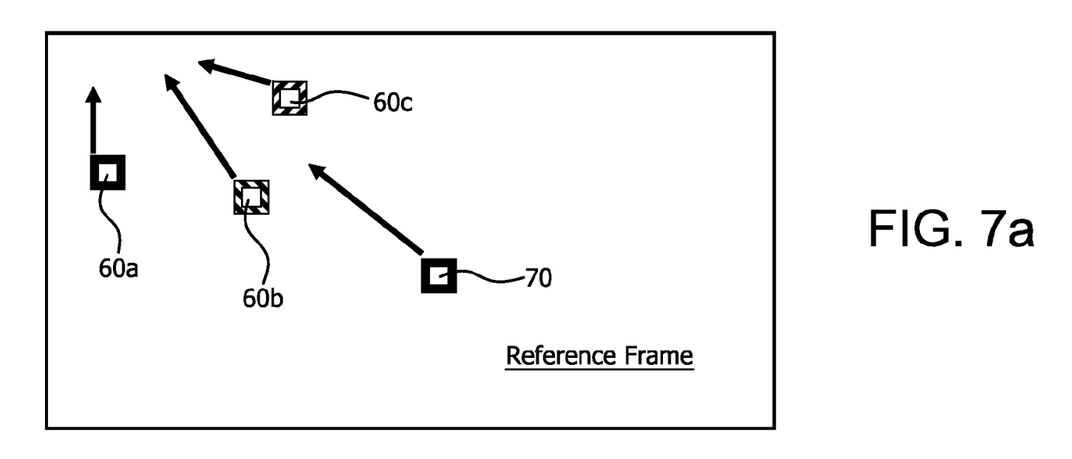
FIGS. 7a and 7b are illustrations of the location of an additional MB in the reference frame depicted in FIG. 6a and corresponding search area for that additional reference frame MB in the subsequent frame depicted in FIG. 6b that falls within an overlapping tile associated with the assigned tile depicted in FIG. 6b.
Figure 7B:
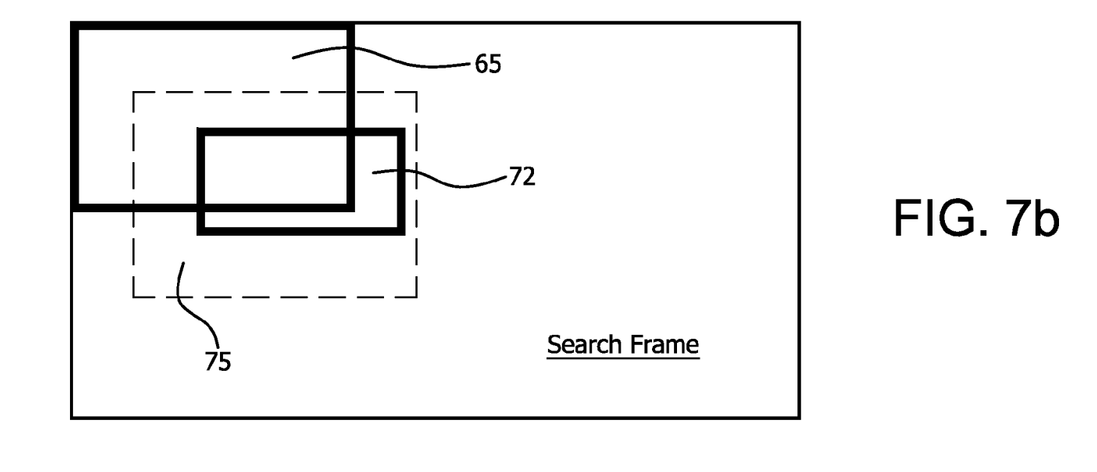

FIG. 7*a* illustrates the location an additional MB 70, including a prediction vector, in the same reference frame depicted in FIG. 6*a*. FIG. 7*b* illustrates a corresponding MB search area 72 in the same search frame depicted in FIG. 6*b*. FIG. 7*b* also depicts the tile 65 and a first overlapping tile 75 associated with the tile 65 for MB search assignment purposes. Although the MB search area 72 does not fall entirely within tile 65, it falls entirely within the associated overlapping tile 75. Accordingly, the MB 70 is included in the filtered list of MBs with respect to the tile 65 when conducting the method steps set forth above.

Figure 8:
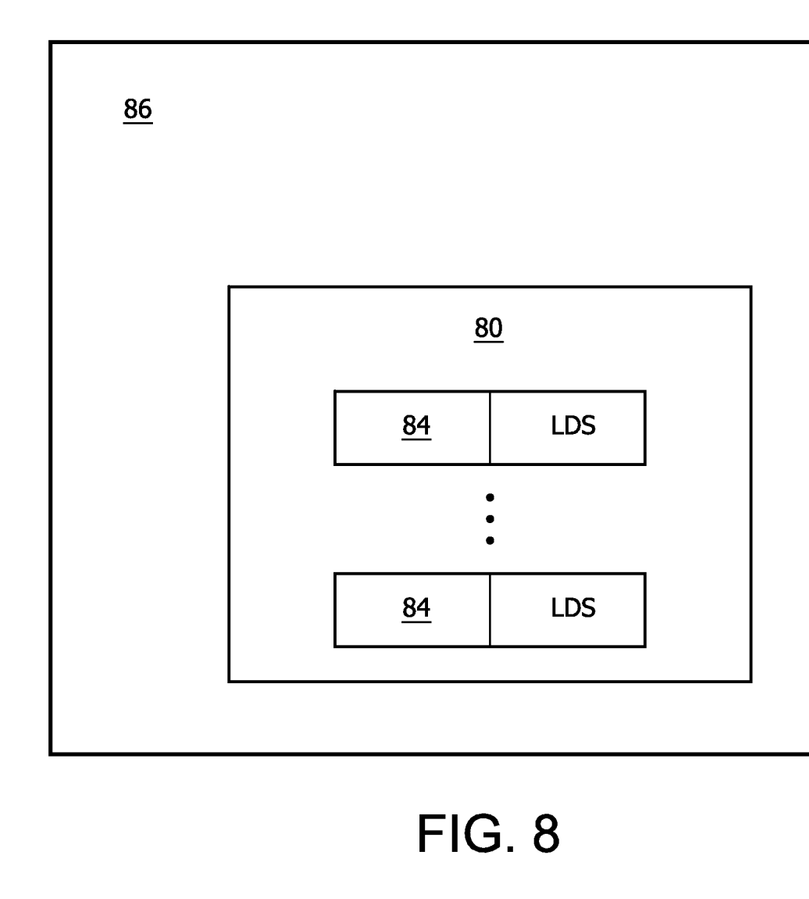
FIG. 8 is a block diagram of an example apparatus configured in accordance with an embodiment of the present invention.

Referring to FIG. 8, an example of a processor 80 configured to perform the above methods is illustrated that includes a plurality of processing elements 84 that are each associated with a local memory LDS. In accordance with the above method, a processing element 84 that is assigned a target tile MB search assignment by the processor 80 with respect tile 65 as the target tile, will preferably proceed to perform that assignment by first loading all of the pel data with respect to pixels within the tile 65 into its local memory LDS and at least conduct searches for the MBs 60*a*, 60*b*, 60*c*. That processing element 84 will then preferably load pel data for any pixels within the associated overlapping tile 75 that was not previously loaded into its local memory LDS and at least conduct a search for the MB 70. Searches for all of the MBs identified in the list generated with respect to the tile 65 MB search assignment are conducted to complete that search assignment.

The above described methods and apparatus can be employed as an integral part of a system, for example system 86 of FIG. 8, that either captures or displays video to more efficiently conduct video motion estimation processing in connection with video encoding, frame rate conversion, super-resolution, etc. Such systems include video recorders, camcorders, video cameras and other types of video capture devices, personal computers and other types of devices that display video, computer displays, televisions and other types of display devices. In particular, the above described methods and apparatus can be integrally incorporated and/or employed where such devices use high speed capture and/or high speed display of high resolution video.

As discussed above, the method of determining coordinates of a search area within a video frame for each of a plurality of MBs of a reference frame is based upon a predicted location derived from the coordinates of the MBs within the reference frame and motion estimation information. This method can be implemented for the encoding and/or display of video independent of the tiling approach discussed above. For example, a video capture or display device can include a processing component configured to conduct searches for MBs within respective search areas within a video frame that are determined based upon predicted locations relative to the coordinates of the MBs within a reference frame.

For example, a further example method can include determining coordinates of a search area within a video frame for each of a plurality of macroblocks (MBs) of a reference frame based upon a predicted location derived from the coordinates of the MB within the reference frame and motion estimation information, such as a motion vector. Then searches are conducted for the MBs within their respective search areas within the video frame.

Such an example method may further include segmenting the video frame to define tiles and then sorting the MB search areas based upon the predicted locations to define, for at least some tiles, associated overlapping tiles. Tile search assignments are preferably defined such that each overlapping tile associated with a given tile has a substantial overlapping portion with the given tile and a search for each MB is assigned to a tile or an overlapping tile, whereby the searches assigned to a given tile and any overlapping tile associated with that tile defines the tile search assignment for that tile. Tile search assignments can be distributed among a plurality of processing elements to concurrently conduct the MB searches within the video frame.

In such a method, tile search assignments are preferably defined for each tile such that the number of searches for each tile search assignment does not exceed a selected maximum number of searches. Search data can be defined for each tile as pel data for each pixel within that tile and any overlapping tile associated with that tile. In performing the method, each processing element preferably has a local memory and conducts MB searches by using its local memory for search data associated with each respective tile search assignment. For example, each processing element can conduct MB searches for a respective tile search assignment by loading pel data for each pixel within the respective tile into the local memory of the processing element and conducting the MB searches assigned to the respective tile. For each overlapping tile associated with the respective tile, pel data for each pixel within the overlapping tile can then be loaded into the local memory of the processing element that was not previously loaded and the MB searches assigned to that overlapping tile can then be conducted.

Preferably a processing component is provided that is configured to perform the disclosed methods that can be advantageously employed in the encoding, transcoding, decoding, and/or display of video. Accordingly, the processing component can be part of a video coding device, a display device, or a device that codes, decodes, and/or displays video either as a separable or integrated component of such devices.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, e.g., netlists, GDS data, or the like, that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method of video processing comprising:
  segmenting a video frame into tiles;
  for at least one tile, identifying at least one overlapping tile such that the at least one overlapping tile has an overlapping portion with the at least one tile, wherein the at least one overlapping tile is offset vertically and/or horizontally from the at least one tile;
  determining coordinates of a search area within the video frame for each of a plurality of macroblocks (MBs) of a reference frame such that each search area is entirely within at least one of the tiles or overlapping tiles; and
  making tile assignments, among a plurality of processing elements to concurrently conduct searches for the MBs within the video frame such that for each assigned tile, the assigned processing element conducts searches for all of the MBs that have search areas entirely within the assigned tile and any overlapping tile associated with assigned tile using a local memory of the assigned processing element for the search data associated with the assigned tile, wherein data to be loaded for the search area is for an area in the overlapping tile but not in the assigned tile.

2. The method of claim 1, the method further comprising: conducting a search for at least one macroblock (MB) within the video frame within a search area entirely within the at least one tile and the at least one overlapping tile associated with the at least one tile, wherein, for at least some tiles, at least one associated overlapping tile is identified such that each overlapping tile associated with a given tile has an overlapping portion with the given tile whereby search data is defined for each tile that comprises pel data for each pel within that tile and any overlapping tile associated with that tile.

3. The method of claim 2 wherein the tile search area coordinates of a MB is determined based upon the coordinates of the MB within the reference frame and a prediction vector.

4. The method of claim 2 wherein the tile assignments are made such that there is a balance in workload among the assigned processing elements.

5. The method of claim 4 wherein the segmentation of the video frame into tiles and/or definition of overlapping tiles are revised to facilitate balancing the workload among the assigned processing elements.

6. The method of claim 5 wherein the segmentation of the video frame into tiles and/or definition of overlapping tiles are revised on a condition that the number of search areas entirely within a tile and any overlapping tiles associated with that tile exceeds a threshold.

7. A method of video processing comprising:
    segmenting a video frame to define tiles;
    determining coordinates of a search area within the video frame for each of a plurality of macroblocks (MBs) of a reference frame based upon a predicted location derived from the coordinates of the MB within the reference frame and motion estimation information; and
    sorting the MB search areas based upon the predicted locations to define, for at least some tiles, associated overlapping tiles and to define tile search assignments such that:
        each overlapping tile associated with a given tile has an overlapping portion with the given tile, wherein the overlapping tile is offset vertically and/or horizontally from the given tile; and
        a search for each MB is assigned to a tile or an overlapping tile whereby the searches assigned to a given tile and any overlapping tile associated with that tile defines the tile search assignment for that tile, and wherein the search area for the search is for an area in the overlapping tile but not in the given tile.

8. The method of claim 7 further comprising:
    distributing tile search assignments among a plurality of processing elements to concurrently conduct the MB searches within the video frame; and
    conducting searches for the MBs within their respective search areas within the video frame.

9. The method of claim 8 wherein:
    tile search assignments are defined for each tile such that the searches for each tile search assignment do not exceed in number a selected maximum number of searches;
    search data is defined for each tile that comprises pel data for each pixel within that tile and any overlapping tile associated with that tile; and
    each processing element has a local memory and conducts MB searches by using its local memory for search data associated with each respective tile search assignment.

10. The method of claim 9 wherein each processing element conducts MB searches for a respective tile search assignment by:
    loading pel data for each pixel within the respective tile into the local memory of the of the processing element and conducting the MB searches assigned to the respective tile; and
    for each overlapping tile associated with the respective tile, loading pel data for each pixel within the overlapping tile into the local memory of the processing element that was not previously loaded and conducting the MB searches assigned to that overlapping tile.

11. The method of claim 10 performed by a processing unit that includes a plurality of SIMD engines that each has a local data storage (LDS) memory wherein the SIMD engines serve as the processing elements.

12. The method of claim 8 wherein overlapping tiles are defined that have the same area as the tiles they are associated with.

13. The method of claim 12 wherein, for at least some tiles, first and second associated overlapping are defined such that the first overlapping tile is disposed at a location that is shifted a predetermined number of pixels vertically and/or horizontally displaced from the tile with which it is associated and the second overlapping tile is disposed at a location that is shifted the predetermined number of pixels vertically and/or horizontally displaced from the first overlapping tile.

14. The method of claim 8 further comprising:
    segmenting the video frame to define tiles;
    sorting the MB search areas based upon the predicted locations to define, for at least some tiles, associated tiles and to define tile search assignments such that a search for each MB is assigned to a tile or an associated tile whereby the searches assigned to a given tile and any tile associated with that tile defines the tile search assignment for that tile; and
    distributing tile search assignments among a plurality of processing elements to concurrently conduct the MB searches within the video frame.

15. The method of claim 14 wherein:
    tile search assignments are defined for each tile such that the searches for each tile search assignment do not exceed in number a selected maximum number of searches;
    search data is defined for each tile that comprises pel data for each pixel within that tile and any tile associated with that tile; and
    each processing element has a local memory and conducts MB searches by using its local memory for search data associated with each respective tile search assignment.

16. An integrated circuit (IC) for facilitating motion estimation in video processing comprising:
    a processing component configured to:
        segment a video frame into tiles;
        identify, for at least one tile, at least one associated overlapping tile such the at least one overlapping tile has an overlapping portion with the at least one tile, wherein the at least one overlapping tile is offset vertically and/or horizontally from the at least one tile;
        determine coordinates of a search area within the video frame for each of a plurality of macroblocks (MBs) of a reference frame such that each search area is entirely within at least one of the tiles or overlapping tiles; and
        make tile assignments, among the plurality of processing elements to concurrently conduct searches for the MBs within the video frame such that for each assigned tile, the assigned processing element conducts searches for all of the MBs that have search areas entirely within the assigned tile and any overlapping tile associated with assigned tile using the local memory of the assigned processing element for the search data associated with the assigned tile, wherein data to be loaded for the search area is for an area in the overlapping tile but not in the assigned tile.

17. The IC according to claim 16 further comprising a plurality of processing elements that each have a local memory wherein the processing component is configured to:
    conduct a search for at least one macroblock (MB) within the video frame within a search area entirely within the at least one tile and the least one overlapping tile associated with the at least one tile;
    identify, for at least some tiles, at least one associated overlapping tile such that each overlapping tile associated with a given tile has an overlapping portion with the given tile whereby search data is defined for each tile that comprises pel data for each pel within that tile and any overlapping tile associated with that tile.

18. The IC of claim 17 wherein the processing component is configured to determine tile search area coordinates of a MB based upon the coordinates of the MB within the reference frame and a prediction vector.

19. The IC of claim 17 wherein the processing component is configured to make tile assignments such that there is a balance in workload among the assigned processing elements.

20. The IC of claim 19 wherein the processing component is configured to revise the segmentation of the video frame into tiles and/or definition of overlapping tiles to facilitate balancing the workload among assigned processing elements.

21. The IC of claim 17 wherein the processing component is configured to revise the segmentation of the video frame into tiles and/or definition of overlapping tiles on a condition that the number of search areas entirely within a tile and any overlapping tiles associated with that tile exceeds a threshold.

22. A video capture and/or display device including the IC according to claim 17.

23. An apparatus for video processing comprising:
a processing component configured to segment a video frame to define tiles and to determine coordinates of a search area within the video frame for each of a plurality of macroblocks (MBs) of a reference frame based upon a predicted location derived from coordinates of the MB within the reference frame and motion estimation information; and
sort the MB search areas based upon the predicted locations to define, for at least some tiles, associated overlapping tiles and to define tile search assignments such that:
each overlapping tile associated with a given tile has a substantial overlapping portion with the given tile, wherein the overlapping tile is offset vertically and/or horizontally from the given tile; and
a search for each MB is assigned to a tile or an overlapping tile whereby the searches assigned to a given tile and any overlapping tile associated with that tile defines the tile search assignment for that tile, and wherein the search area for the search is for an area in the overlapping tile but not in the given tile.

24. The apparatus of claim 23 further comprising a plurality of processing elements, wherein the processing component is configured to:
distribute tile search assignments among the plurality of processing elements to concurrently conduct the MB searches within the video frame;
the processing component configured to conduct searches for the MBs within their respective search areas within the video frame.

25. The apparatus of claim 24 wherein:
the processing component is configured to define tile search assignments for each tile such that the searches for each tile search assignment do not exceed in number a selected maximum number of searches;
search data is defined for each tile that comprises pel data for each pixel within that tile and any overlapping tile associated with that tile; and
each processing element has a local memory and is configured to conduct MB searches by using its local memory for search data associated with each respective tile search assignment.

26. The apparatus of claim 25 wherein each processing element is configured to conduct MB searches for a respective tile search assignment by:
loading pel data for each pixel within the respective tile into the local memory of the of the processing element and conducting the MB searches assigned to the respective tile; and
for each overlapping tile associated with the respective tile, loading pel data for each pixel within the overlapping tile into the local memory of the processing element that was not previously loaded and conducting the MB searches assigned to that overlapping tile.

27. The apparatus of claim 23 further comprising a plurality of processing elements, wherein the processing component is configured to:
segment the video frame to define tiles;
sort the MB search areas based upon the predicted locations to define, for at least some tiles, associated tiles and to define tile search assignments such that a search for each MB is assigned to a tile or an overlapping tile whereby the searches assigned to a given tile and any tile associated with that tile defines the tile search assignment for that tile; and
distribute tile search assignments among the plurality of processing elements to concurrently conduct the MB searches within the video frame.

28. The apparatus of claim 27 wherein:
the processing component is configured to define tile search assignments for each tile such that the searches for each tile search assignment do not exceed in number a selected maximum number of searches;
search data is defined for each tile that comprises pel data for each pixel within that tile and any tile associated with that tile; and
each processing element has a local memory and is configured to conduct MB searches by using its local memory for search data associated with each respective tile search assignment.

29. The apparatus of claim 23 configured as a video capture and/or display device.

30. A non-transitory computer-readable storage medium storing a set of instructions for execution by one or more processors to facilitate manufacture of an integrated circuit that includes:
a plurality of processing elements;
each processing element have a local memory; and
a processing component configured to:
segment a video frame into tiles;
identify, for at least some tiles, at least one associated overlapping tile such that each overlapping tile associated with a given tile has an overlapping portion with the given tile, wherein the at least one overlapping tile is offset vertically and/or horizontally from the at least one tile, whereby search data is defined for each tile that comprises pel data for each pel within that tile and any overlapping tile associated with that tile;
determine coordinates of a search area within the video frame for each of a plurality of macroblocks (MBs) of a reference frame such that each search area is entirely within at least one of the tiles or overlapping tiles; and
make tile assignments, among the plurality of processing elements to concurrently conduct searches for the MBs within the video frame such that for each assigned tile, the assigned processing element conducts searches for all of the MBs that have search areas entirely within the assigned tile and any overlapping tile associated with assigned tile using the local memory of the assigned processing element for the search data associated with the assigned tile, wherein data to be loaded for the search area is for an area in the overlapping tile but not in the assigned tile.

31. The non-transitory computer-readable storage medium of claim 30 wherein the instructions are hardware description language (HDL) instructions used for the manufacture of a device.

32. A non-transitory computer-readable storage medium storing a set of instructions for execution by one or more processors to facilitate manufacture of an integrated circuit that includes:
- a processing component configured to determine coordinates of a search area within a video frame for each of a plurality of macroblocks (MBs) of a reference frame based upon a predicted location derived from coordinates of the MB within the reference frame and motion estimation information; and
- the processing component configured to conduct searches for the MBs within their respective search areas within the video frame, wherein the MB search areas are sorted based upon the predicted locations to define, for at least some tiles, associated overlapping tiles and to define tile search assignments such that:
  - each overlapping tile associated with a given tile has an overlapping portion with the given tile, wherein the overlapping tile is offset vertically and/or horizontally from the given tile; and
  - a search for each MB is assigned to a tile or an overlapping tile whereby the searches assigned to a given tile and any overlapping tile associated with that tile defines the tile search assignment for that tile, and wherein the search area for the search is for an area in the overlapping tile but not in the given tile.

33. The non-transitory computer-readable storage medium of claim 32 wherein the instructions are hardware description language (HDL) instructions used for the manufacture of a device.

* * * * *